United States Patent
Yang

(10) Patent No.: US 11,320,707 B2
(45) Date of Patent: May 3, 2022

(54) DISPLAY PANEL, DISPLAY DEVICE, AND LIQUID CRYSTAL DISPLAY

(71) Applicant: HKC CORPORATION LIMITED, Guangdong (CN)

(72) Inventor: Yanna Yang, Chongqing (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 17/044,257

(22) PCT Filed: Dec. 25, 2018

(86) PCT No.: PCT/CN2018/123306
§ 371 (c)(1),
(2) Date: Sep. 30, 2020

(87) PCT Pub. No.: WO2020/118766
PCT Pub. Date: Jun. 18, 2020

(65) Prior Publication Data
US 2021/0055585 A1    Feb. 25, 2021

(30) Foreign Application Priority Data

Dec. 14, 2018   (CN) .......................... 201822112820.6

(51) Int. Cl.
*G02F 1/1362* (2006.01)
*G02F 1/1333* (2006.01)
(Continued)

(52) U.S. Cl.
CPC ...... *G02F 1/1362* (2013.01); *G02F 1/133345* (2013.01); *G02F 1/133512* (2013.01);
(Continued)

(58) Field of Classification Search
CPC .................. G02F 1/136222; G02F 1/133512
See application file for complete search history.

(56) References Cited

U.S. PATENT DOCUMENTS

2003/0025857 A1* 2/2003 Ochiai .............. G02F 1/133371
349/106
2008/0068536 A1* 3/2008 Kim .................. G02F 1/133512
349/106
(Continued)

FOREIGN PATENT DOCUMENTS

CN        202710771 U    1/2013
CN        104465696 A    3/2015
(Continued)

OTHER PUBLICATIONS

The International Search Report and Written Opinion dated Sep. 27, 2019; PCT/CN2018/123306.

*Primary Examiner* — Mariam Qureshi
(74) *Attorney, Agent, or Firm* — Westbridge IP LLC

(57) ABSTRACT

The present disclosure provides a display panel, a display device, and a liquid crystal display. The display panel includes a first substrate, a second substrate, and a liquid crystal layer disposed between the first substrate and the second substrate. The second substrate includes sequentially stacked a basal substrate layer of a array substrate, a gate electrode insulating layer, a color resist layer, a protective layer, and a pixel electrode layer. The color resist layer includes a first color resist, a second color resist, and a third color resist, and a thickness of the third color resist is less than a thickness of the first color resist or a thickness of the second color resist.

8 Claims, 2 Drawing Sheets

(51) Int. Cl.
*G02F 1/1335* (2006.01)
*G02F 1/1343* (2006.01)

(52) U.S. Cl.
CPC .. *G02F 1/134309* (2013.01); *G02F 1/136222* (2021.01); *G02F 2201/121* (2013.01); *G02F 2201/123* (2013.01); *G02F 2201/50* (2013.01)

(56) References Cited

U.S. PATENT DOCUMENTS

| | | | |
|---|---|---|---|
| 2008/0231779 A1* | 9/2008 | Shin | G02F 1/136213 349/106 |
| 2009/0180062 A1* | 7/2009 | Kim | G02F 1/136209 349/106 |
| 2011/0273649 A1 | 11/2011 | Matsui et al. | |
| 2013/0021550 A1* | 1/2013 | Watakabe | G02F 1/136209 349/43 |
| 2015/0085229 A1* | 3/2015 | Park | G02F 1/133345 349/105 |
| 2015/0248038 A1* | 9/2015 | Zhang | G02F 1/1368 257/390 |
| 2020/0019029 A1* | 1/2020 | Park | G02F 1/136209 |

FOREIGN PATENT DOCUMENTS

| | | |
|---|---|---|
| CN | 104965333 A | 10/2015 |
| CN | 205862052 U | 1/2017 |
| CN | 107608123 A | 1/2018 |

\* cited by examiner

DISPLAY PANEL, DISPLAY DEVICE, AND LIQUID CRYSTAL DISPLAY

CROSS-REFERENCE TO RELATED APPLICATIONS

The present application is the National Stage of International Application with No. PCT/CN2018/123306, filed on Dec. 25, 2018, which claims the benefit of Chinese Patent Application with No. 201822112820.6, filed on Dec. 14, 2018 and entitled "Display Panel and Display Device", the entirety of which is incorporated herein by reference.

FIELD

The present disclosure relates to the field of display technology, and in particular, to a display panel, a display device, and a liquid crystal display.

BACKGROUND

Liquid Crystal Display (LCD) is one of the most widely used displays. The LCD includes a pair of panels and a liquid crystal layer located between the panels. The panels are provided with common electrodes and field-generating electrodes such as pixel electrodes. An electric field is generated in the liquid crystal layer when voltage is applied to the field-generating electrode, and liquid crystal molecules deflect under the action of the electric field to control the transmission of light, which enables the LCD to display images.

A structure of an exemplary display panel is shown in FIG. 1, the display panel includes a first substrate, a second substrate, and a liquid crystal layer disposed between the first substrate and the second substrate. A color resist layer of the second substrate includes a first color resist, a second color resist, and a third color resist. Thicknesses of the first color resist, the second color resist, and the third color resist of the exemplary display panel are the same, so a transmittance of pixels in a region of the third color resist is relatively low, leading to yellow discolouration of the images displayed on the exemplary display panel, which seriously affects the picture quality of the display panel.

SUMMARY

The main purpose of the present disclosure is to provide a display panel, aiming to solve the problem that images displayed on the display panel are yellow discolouration.

To achieve the above purpose, the display panel provided by the present disclosure includes: a first substrate, a second substrate spaced apart from and opposite to the first substrate, and a liquid crystal layer disposed between the first substrate and the second substrate. The second substrate includes sequentially stacked a basal substrate layer of a array substrate, a gate electrode insulating layer, a color resist layer, a protective layer, and a pixel electrode layer. The color resist layer includes a first color resist, a second color resist, and a third color resist, and a thickness of the third color resist is less than a thickness of the first color resist or a thickness of the second color resist.

Optionally, the thickness of the first color resist is approximately equal to the thickness of the second color resist.

Optionally, the thickness of the first color resist or the thickness of the second color resist is at least 2.40 micrometers, and at most 2.70 micrometers.

Optionally, a difference between the thickness of the third color resist and the thickness of the first color resist is at least 0.15 micrometers, and at most 0.25 micrometers.

Optionally, the thickness of the third color resist is at least 2.30 micrometers, and at most 2.41 micrometers.

Optionally, a thickness of the pixel electrode layer is 75 nanometers.

Optionally, the second substrate further includes a dielectric layer disposed between the basal substrate layer of the array substrate and the gate electrode insulating layer, and a refractive index of the dielectric layer is between a refractive index of the basal substrate layer of the array substrate and a refractive index of the gate electrode insulating layer.

Optionally, the protective layer facing the third color resist, and the protective layer facing the first color resist and the second color resist are uniform in thickness.

Optionally, the first substrate includes a basal substrate layer of a color film substrate, a black matrix layer, and a common electrode layer; the black matrix layer is disposed on the basal substrate layer of the color film substrate, and the common electrode layer is disposed on the black matrix layer and the exposed basal substrate layer of the color film substrate; the black matrix layer is disposed corresponding to joints of the first color resist, the second color resist, and the third color resist.

The present disclosure further provides a display device including the display panel, and the display panel includes:

a first substrate; a second substrate spaced apart from and opposite to the first substrate, and a liquid crystal layer disposed between the first substrate and the second substrate. The second substrate includes sequentially stacked a basal substrate layer of a array substrate, a gate electrode insulating layer, a color resist layer, a protective layer, and a pixel electrode layer. The color resist layer includes a first color resist, a second color resist, and a third color resist, and a thickness of the third color resist is less than a thickness of the first color resist or a thickness of the second color resist.

Optionally, the thickness of the first color resist is approximately equal to the thickness of the second color resist.

Optionally, the thickness of the first color resist or the thickness of the second color resist is at least 2.40 micrometers, and at most 2.70 micrometers.

Optionally, a difference between the thicknesses of the third color resist and the first color resist is at least 0.15 micrometers, and at most 0.25 micrometers.

Optionally, the thickness of the third color resist is at least 2.30 micrometers, and at most 2.41 micrometers.

Optionally, the second substrate further includes a dielectric layer disposed between the basal substrate layer of the array substrate and the gate electrode insulating layer, and a refractive index of the dielectric layer is between a refractive index of the basal substrate layer of the array substrate and a refractive index of the gate electrode insulating layer.

The present disclosure further provides a liquid crystal display including the display panel, and the display panel includes:

a first substrate; a second substrate spaced apart from and opposite to the first substrate, and a liquid crystal layer disposed between the first substrate and the second substrate. The second substrate includes sequentially stacked a basal substrate layer of a array substrate, a gate electrode insulating layer, a color resist layer, a protective layer, and a pixel electrode layer. The color resist layer includes a first color resist, a second color resist, and a third color resist, and a thickness of the third color resist is less than a thickness of the first color resist or a thickness of the second color resist.

Optionally, the thickness of the first color resist is approximately equal to the thickness of the second color resist.

Optionally, the thickness of the first color resist or the thickness of the second color resist is at least 2.40 micrometers, and at most 2.70 micrometers.

According to the transmittance formula $$T = \frac{1}{2}\sin^2 2\phi \times \sin^2 \frac{\pi \Delta nd}{\lambda},$$

in which T is the transmittance, Ø is the azimuth between the absorption axis of the polarizing plate and the long axis of the liquid crystal molecule, and $\Delta nd$ is the phase difference. When $\Delta nd$ is constant, and Ø=45°, T may reach its maximum value. In case Ø is constant, the light transmittance may be changed by changing $\Delta nd$. According to the display panel provided by the present disclosure, the thickness of the third color resist is reduced, thus a thickness of a liquid crystal cell, namely, d in the transmittance formula may be increased, so that it satisfies $$0 \leq \pi \Delta nd/\lambda \leq \frac{\pi}{2}.$$

In this case, the transmittance increases as the value of d increases. A thickness of a liquid crystal cell at the first color resist or a thickness of a liquid crystal cell at the second color resist is recorded as $d_1$, and the thickness of the liquid crystal cell at the third color resist is recorded as $d_2$, then $d_1 < d_2$, and a transmittance of pixels in the region of the third color resist is higher than a transmittance of pixels in the region of the first color resist or a transmittance of pixels in the region of the second color resist. Thus the brightness of blue light may be improved, which may solve the problem that images displayed on the display panel are yellow discolouration, and improve the picture quality of the display panel.

BRIEF DESCRIPTION OF THE DRAWINGS

In order to more clearly illustrate the technical solutions in the embodiments of the present disclosure or the exemplary techniques, the drawings to be used in the embodiments or the description of the exemplary embodiments will be briefly described below. Obviously, the drawings in the following description are only certain embodiments of the present disclosure, and other drawings may be obtained according to the structures shown in the drawings without any creative work for those skilled in the art.

Figure 1:
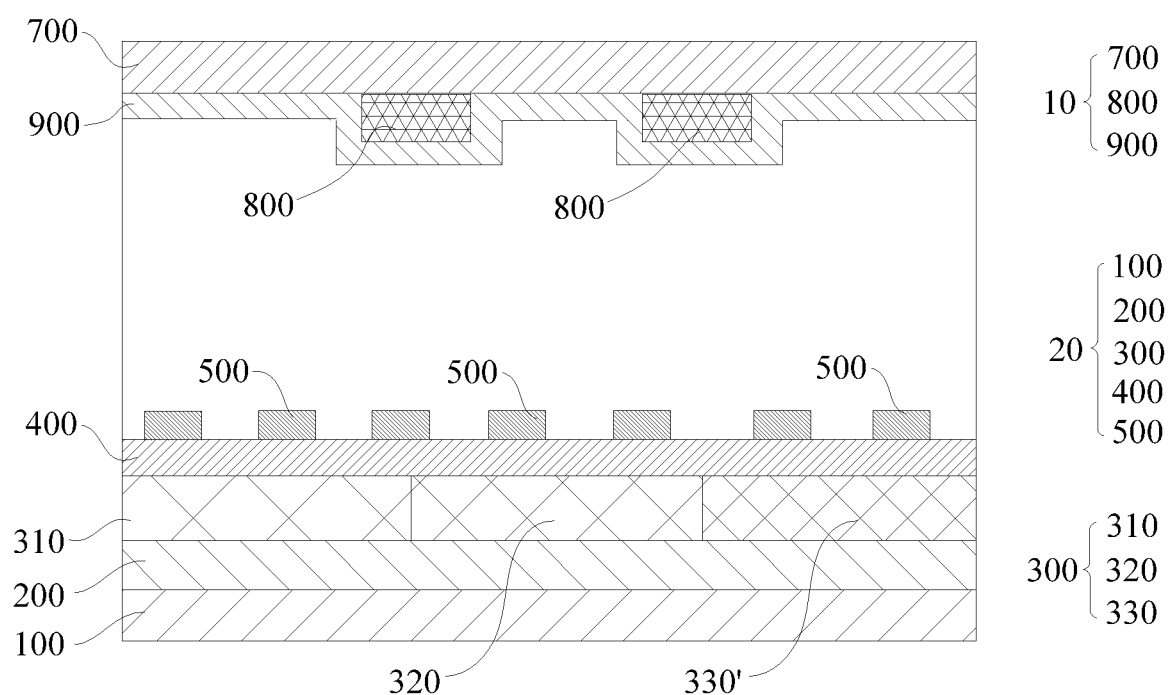
FIG. 1 is a schematic structural view of an exemplary display panel.

The implementation, functional features and advantages of the present disclosure will be further described with reference to the accompanying drawings.

DETAILED DESCRIPTION OF THE EMBODIMENTS

The technical solutions in the embodiments of the present disclosure are clearly and completely described in the following with reference to the drawings in the embodiments of the present disclosure. It is obvious that the described embodiments are only a part of the embodiments of the present disclosure, and not all of the embodiments. All other embodiments obtained by those of ordinary skill in the art without creative labor based on the embodiments here are within the scope of protection in the present disclosure.

It should be noted that all directional indications (such as up, down, left, right, front, back, . . . ) in the embodiments of the present disclosure are only used to explain relative positional relationship, motion situation, etc. between components in a certain posture (as shown in the drawing). If the specific posture changes, the directional indication also changes accordingly.

In addition, the descriptions of "first", "second", and the like in the present disclosure are used for the purpose of description only, and are not to be construed as indicating or implying their relative importance or implicitly indicating the number of technical features indicated. Thus, features defining "first" or "second" may include at least one of the features, either explicitly or implicitly. In addition, the technical solutions between the various embodiments may be combined with each other, but must be based on the realization of those skilled in the art, and when the combination of the technical solutions is contradictory or impossible to implement, it should be considered that the combination of the technical solutions does not exist, nor is it within the scope of protection required by this disclosure.

The present disclosure provides a display panel, which improves a transmittance of pixels in a region of a third color resist and solves a problem of a yellowish tint in the display panel.

Figure 2:
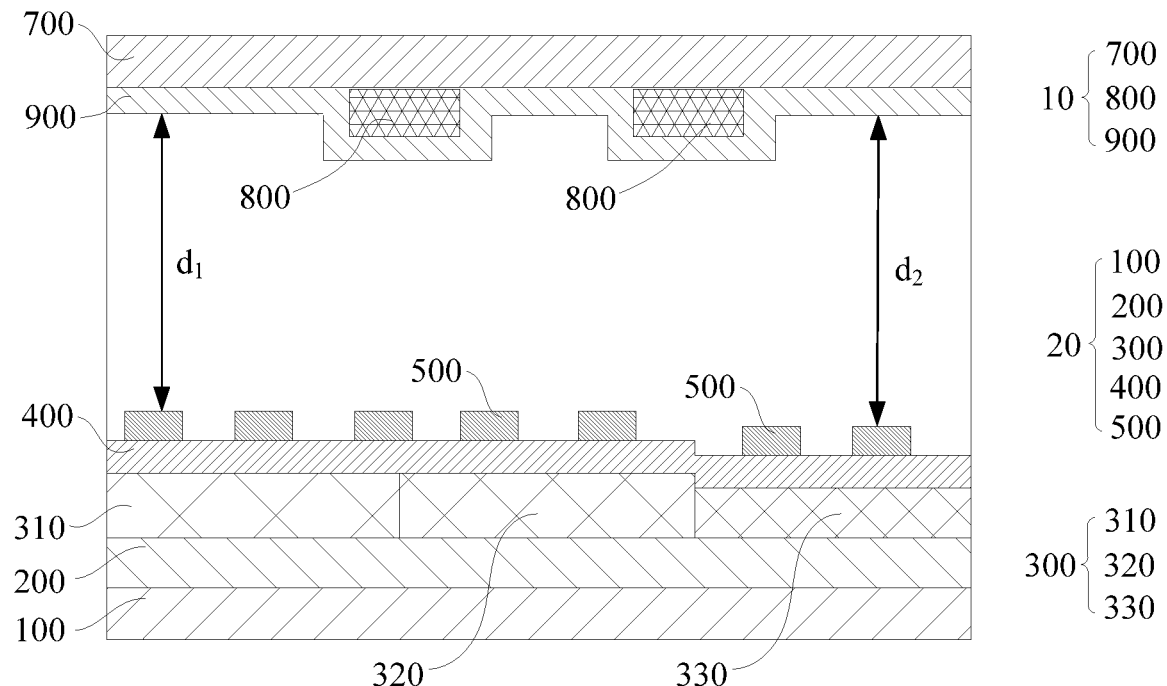
FIG. 2 is a schematic structural view of a display panel according to an embodiment of the present disclosure.

In an embodiment of the present disclosure, as shown in FIG. 2, the display panel includes a first substrate 10, a second substrate 20, and a liquid crystal layer (not shown) disposed between the first substrate 10 and the second substrate 20. The second substrate 20 is spaced apart from and opposite to the first substrate 10, and the liquid crystal layer is disposed between the first substrate 10 and the second substrate 20. The second substrate 20 includes a basal substrate layer of a array substrate 100, a gate electrode insulating layer 200, a color resist layer 300, a protective layer 400, and a pixel electrode layer 500 which are sequentially stacked. The color resist layer 300 includes a first color resist 310, a second color resist 320, and a third color resist 330, and a thickness of the third color resist 330 is less than a thickness of the first color resist 310 or a thickness of the second color resist 320.

It should be noted that, the first color resist is a red color resist, and the second color resist is a green color resist, and the third color resist is a blue color resist. Red, green and blue are the three primary colors of colored light. When red light and green light are mixed, yellow light will be formed. When yellow light and blue light are mixed, white light will be formed. The intensity of blue light of the exemplary display panel is weak, leading to a yellow tint in the exemplary display panel, which seriously affects the picture quality of the display panel.

According to the transmittance formula $$T = \frac{1}{2}\sin^2 2\phi \times \sin^2 \frac{\pi \Delta nd}{\lambda},$$

in which T is the transmittance, Ø is the azimuth between the absorption axis of the polarizing plate and the long axis of the liquid crystal molecule, and Δnd is the phase difference. When Δnd is constant, and Ø=45°, T may reach its maximum value. In case Ø is constant, the light transmittance may be changed by changing Δnd. According to the present solution, phase differences at the first color resist 310, the second color resist 320, and the third color resist 330 are changed by providing different outlines for the pixel electrodes disposed on the first color resist 310, the second color resist 320, and the third color resist 330, which may improve the transmittance of pixels in the region of the third color resist, thereby the problem that images displayed on the display panel are yellow discolouration is solved.

Specifically, thicknesses of liquid crystal cells at the first color resist 310, the second color resist 320, and the third color resist 330, namely, d in the transmittance formula, may be adjusted by changing the thickness of the third color resist 330, so that it satisfies $$0 \le \pi \Delta n d/\lambda \le \frac{\pi}{2},$$

where λ is the wavelength; in this case, the transmittance increases as the value of d increases. The thickness of the liquid crystal cell at the first color resist 310 or the thickness of the liquid crystal cell at the second color resist 320 is recorded as $d_1$, and the thickness of the liquid crystal cell at the third color resist 330 is recorded as $d_2$, then $d_1 < d_2$, and the transmittance of pixels in the region of the third color resist 330 is higher than a transmittance of pixels in a region of the first color resist 310 or a transmittance of pixels in a region of the second color resist 320. Thus the brightness of blue light may be improved, which solves the problem that images displayed on the display panel are yellow discolouration, and improves the picture quality of the display panel.

In order to solve the problem that images displayed on the display panel are yellow discolouration, according to the display panel provided by the present disclosure, the thickness of the third color resist 330 is reduced to improve a transmittance of the light source at a blue sub-pixel electrode, thereby the brightness of blue light is improved. In this way, blue light may be mixed with excess yellow light to form white light. Therefore, the problem of the yellowish tint in the liquid crystal display may be solved, and the picture quality of the display panel may be improved.

It should be noted that the display panel provided by the present disclosure may at least be applied to devices such as televisions, computer monitors, mobile phones, notebooks, etc., which is widely used and has a good market application prospect.

Referring to FIG. 2, in order to obtain uniform yellow light after mixing red light and green light, in an embodiment of the present disclosure, the thickness of the first color resist 310 is approximately equal to the thickness of the second color resist 320. In this case, intensities of red light and green light are similar, and no color shift appears in yellow light after the mixing of red light and green light, thereby ensuring that the problem of the yellowish tint in the liquid crystal display be effectively solved after mixing blue light and yellow light, and improving the picture quality of the display panel.

In an embodiment of the present disclosure, the thickness of the first color resist 310 or the thickness of the second color resist 320 is at least 2.40 micrometers, and at most 2.70 micrometers. Optionally, in the present embodiment, the thickness of the first color resist 310 or the thickness of the second color resist 320 is at least 2.50 micrometers, and at most 2.61 micrometers. White light of the backlight passes through the liquid crystal layer and is irradiated onto the red, green and blue color resists of the color resist layer 300 to form red light, green light, and blue light, which are finally mixed in the human eyes to form color images. When the thickness of the first color resist 310 or the thickness of the second color resist 320 is at least 2.50 micrometers, and at most 2.61 micrometers, the color resist layer 300 has high transmittance and sufficient color reproduction ability.

In an embodiment of the present disclosure, a difference between the thicknesses of the third color resist and the first color resist is at least 0.15 micrometers, and at most 0.25 micrometers. Specifically, since the thickness of the first color resist 310 is approximately equal to the thickness of the second color resist 320, the difference between the thicknesses of the third color resist 330 and the first color resist 310 is hence approximately equal to a difference between the thicknesses of the third color resist 330 and the second color resist 320. The difference between the thicknesses of the third color resist 330 and the first color resist 310 will be described as an example herein.

In the present embodiment, the difference between the thicknesses of the third color resist 330 and the first color resist 310 is at least 0.15 micrometers, and at most 0.25 micrometers. In this case, considering that the thickness of the first color resist 310 is at least 2.50 micrometers, and at most 2.61 micrometers, the thickness of the third color resist 330 is hence at least 2.25 micrometers, and at most 2.46 micrometers. Optionally, an optional thickness of the third color resist 330 may be at least 2.30 micrometers, and at most 2.41 micrometers. Compared with the exemplary display panel, the display panel provided by the present disclosure only changes the development process of the third color resist 330, namely, a thickness of a deposited film of the third color resist 330 is smaller than a thickness of a deposited film of the first color resist 310 or a thickness of a deposited film of the second color resist 320.

In an embodiment of the present disclosure, a thickness of the pixel electrode layer 500 has a significant influence on the transmittance, and the transmittance is significantly decreased in case the thickness of the pixel electrode layer 500 is increased; the thickness of the pixel electrode layer 500 also has an influence on a chromaticity of the display panel, and the effect is that the thicker the pixel electrode layer 500 is, the more yellow the display panel is. Therefore, in the present embodiment, the thickness of the pixel electrode layer 500 is relative thin. Specifically, the thickness of the pixel electrode layer 500 is at least 75 nanometers, and at most 85 nanometers.

Specifically, the experimental data is as follows:

TABLE 1

Experimental data sheet for the relationship between the transmittance and the thickness of the third color resist and the thickness of the pixel electrode layer

| Thickness of third color resist 330 (μm) | Thickness of pixel electrode layer 500 (nm) Transmittance (%) | | |
|---|---|---|---|
| | 75 nm | 80 nm | 85 nm |
| 2.25 | 93.76 | 90.53 | 86.33 |
| 2.30 | 93.84 | 90.10 | 86.24 |
| 2.35 | 93.20 | 90.21 | 85.87 |

TABLE 1-continued

Experimental data sheet for the relationship between the transmittance and the thickness of the third color resist and the thickness of the pixel electrode layer

| Thickness of third color resist | Thickness of pixel electrode layer 500 (nm) Transmittance (%) | | |
|---|---|---|---|
| 330 (μm) | 75 nm | 80 nm | 85 nm |
| 2.40 | 92.76 | 89.76 | 84.39 |
| 2.45 | 92.11 | 88.13 | 83.35 |

As can be seen from Table 1, an optional thickness of the pixel electrode layer 500 is 75 nanometers, and an optional thickness of the third color resist 330 is 2.30 micrometers. In this case, the transmittance is up to 93.84%.

According to the Fresnel equation of the optical fundamental theorem, the reflectivity R and the transmittance T are as follows:

$$R=(n_1-n_2)^2/(n_1+n_2)^2, T=1-R=4n_1n_2;$$

When light is incident from a medium of a refractive index m into a medium of a refractive index $n_2$, light at the interface will partially penetrate and partially reflect. According to the above formula, in case light is incident from a medium of a refractive index n=2 into a medium of a refractive index n=1, the interfacial reflection loss is 11%. If a material having a refractive index n=1.5 is added between the two mediums, the interfacial reflection loss is 6%. Therefore, it can be found that the transmittance may be greatly improved by adding a material having a refractive index in between.

Figure 3:
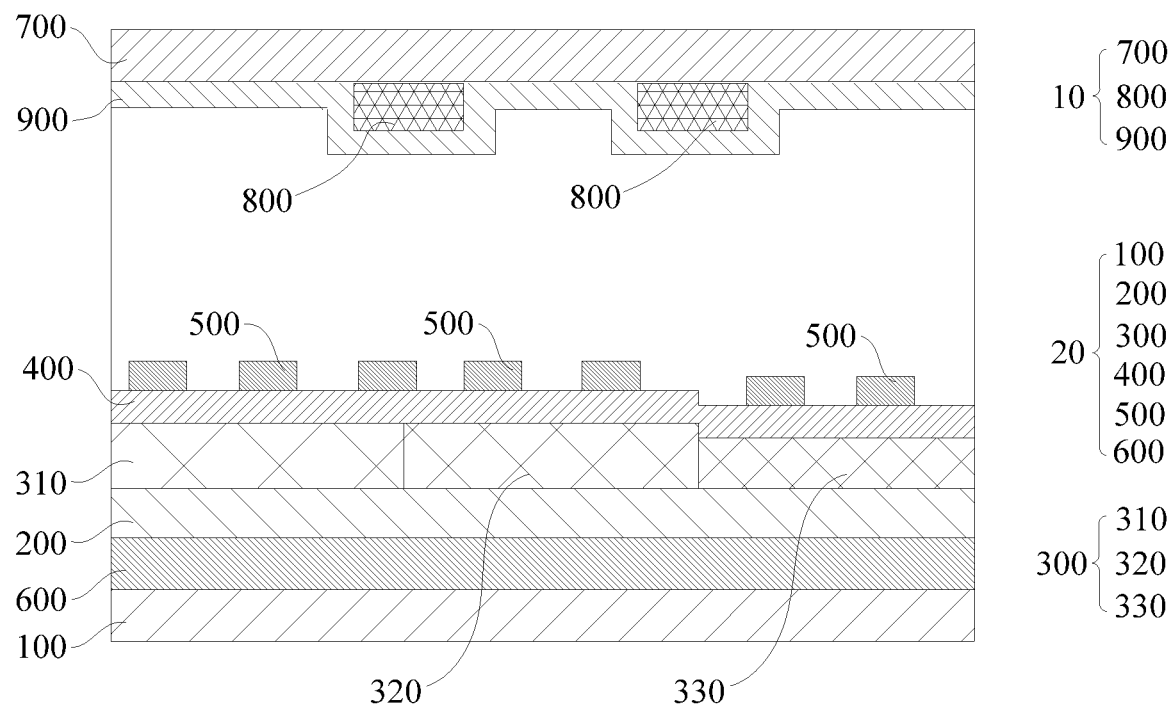
FIG. 3 is a schematic structural view of a display panel according to another embodiment of the present disclosure.

As shown in FIG. 3, in another embodiment of the present disclosure, in consideration of the above principle, the display panel provided by the present disclosure further includes a dielectric layer 600 disposed between the basal substrate layer of the array substrate 100 and the gate electrode insulating layer 200. Specifically, the second substrate 20 further includes a dielectric layer 600 disposed between the basal substrate layer of the array substrate 100 and the gate electrode insulating layer 200, and a refractive index of the dielectric layer 600 is between a refractive index of the basal substrate layer of the array substrate 100 and a refractive index of the gate electrode insulating layer 200. In this case, the transmittance of the second substrate 20 may be improved, thereby the display effect of the display panel is improved.

It should be noted that the refractive index of the dielectric layer 600 between the refractive index of the basal substrate layer of the array substrate 100 and the refractive index of the gate electrode insulating layer 200 means that, the refractive index of the dielectric layer 600 is larger than a smaller value of the refractive index of the basal substrate layer of the array substrate 100 and the refractive index of the gate electrode insulating layer 200, and is smaller than a larger value of the refractive index of the basal substrate layer of the array substrate 100 and the refractive index of the gate electrode insulating layer 200. Optionally, the refractive index of the dielectric layer 600 is the average of the smaller value and the larger value. In particular, in case the refractive index of the basal substrate layer of the array substrate 100 is approximately equal to the refractive index of the gate electrode insulating layer 200, the refractive index of the dielectric layer 600 is approximately equal to the refractive index of the basal substrate layer of the array substrate 100 or the refractive index of the gate electrode insulating layer 200.

Referring to FIG. 2, in order to facilitate the forming of the protective layer 400, in an embodiment of the present disclosure, a thickness of the protective layer 400 facing the third color resist 330 is approximately equal to a thickness of the protective layer 400 facing the first color resist 310 or a thickness of the protective layer 400 facing the second color resist 320.

Referring to FIG. 2, a production process of the second substrate 20 will now be described. Firstly, the gate electrode insulating layer 200 is formed on the basal substrate layer of the array substrate 100; then, the first color resist 310, the second color resist 320, and the third color resist 330 are sequentially formed on the gate electrode insulating layer 200 to form the color resist layer 300; optionally, a photovoltaic (PV) protective layer 400 is deposited on the color resist layer 300; finally, the pixel electrode layer 500 is formed on the PV protective layer 400. Since the PV protective layer 400 is uniform in thickness, it can be conveniently formed on the color resist layer 300.

The design of the present disclosure is not limited thereto. In other embodiments, the thickness of the protective layer 400 facing the third color resist 330 is smaller than the thickness of the protective layer 400 facing the first color resist 310 or the thickness of the protective layer 400 facing the second color resist 320. In this case, the light transmittance of light at the third color resist 330 may be improved.

In an embodiment of the present disclosure, continue refer to FIG. 2, a structure of the first substrate 10 will now be described. The first substrate 10 includes a basal substrate layer of a color film substrate 700, a black matrix layer 800, and a common electrode layer 900; the black matrix layer 800 is disposed on the basal substrate layer of the color film substrate 700, and the common electrode layer 900 is disposed on the black matrix layer 800 and the exposed basal substrate layer of the color film substrate 700; the black matrix layer 800 is disposed corresponding to joints of the first color resist 310, the second color resist 320, and the third color resist 330.

Main functions of the black matrix layer 800 are as follows:

(1) Shielding the liquid crystal disorder caused by the electric field disorder near the data line of the scanning line and avoiding uncontrolled light leakage of the emitted light; (2) preventing color mixing between sub-pixels and improving the color purity of the displayed image; (3) preventing external light from being irradiated on the semiconductor layer material (a-Si; H) having photosensitive properties of the Thin Film Transistor (TFT) channel to cause an increase in photo-generated current, namely, a TFT drain electrode, resulting in failure of turning off the TFT, which affects the display performance; (4) the black matrix layer at edges of the display area further acts to block light of the backlight, and improves the visual effect as a transition zone between the display area and the surrounding mechanical metal frame.

The present disclosure further provides a display device (not shown), which includes a display panel, and the specific structure of the display panel may refer to the above embodiments. The display device provided by the present disclosure adopts all the technical solutions of all the above embodiments, and therefore has at least all the advantages brought by the technical solutions of the above embodiments, and details are not described herein. Specifically, the display device may be, but not limited to, a television set, a display, or the like. Specifically, in an embodiment of the present disclosure, the display device is a liquid crystal display; in other embodiments of the present disclosure, the display device may also be an Organic Light-Emitting Diode (OLED) display or the like.

The above descriptions are only alternative embodiments of the present disclosure, and is not intended to limit the scope of the disclosure of the present disclosure. All the equivalent structural transformation made by the disclosure specification and the attached drawings under the idea of the disclosure, or directly/indirectly used in other relevant technical fields are included in the patent protection scope of the disclosure.

What is claimed is:

1. A display panel, wherein, the display panel comprises:
   a first substrate;
   a second substrate spaced apart from and opposite to the first substrate, the second substrate comprising sequentially stacked a basal substrate layer of a array substrate, a gate electrode insulating layer, a color resist layer, a protective layer, and a pixel electrode layer, the color resist layer comprising a first color resist, a second color resist, and a third color resist, a thickness of the third color resist being less than a thickness of the first color resist or a thickness of the second color resist; and
   a liquid crystal layer disposed between the first substrate and the second substrate;
   wherein, a thickness of the protective layer facing the third color resist is smaller than a thickness of the protective layer facing the first color resist and the second color resist, and the thickness of the protective layer is a height difference between a top surface of the protective layer and a bottom surface of the protective layer;
   wherein the first color resist is a red color resist, the second color resist is a green color resist, and the third color resist is a blue color resist;
   the thickness of the first color resist is apporximately equal to the thickness of the second color resist;
   a thickness of a deposited film of the third color resist is smaller than a thickness of a deposited film of the first color resist or a thickness deposited film of the second color resist;
   the thickness of the first color resist or the thickness of the second color resist is at least 2.40 micrometers, and at most 2.70 micrometers; and
   the thickness of the third color resist is at least 2.30 micrometers, and at most 2.41 micrometers.

2. The display panel of claim 1, wherein, a thickness of the pixel electrode layer is 75 nanometers, and at most 85 nanometers.

3. The display panel of claim 1, wherein, the second substrate further comprises a dielectric layer disposed between the basal substrate layer of the array substrate and the gate electrode insulating layer, a refractive index of the dielectric layer being between a refractive index of the basal substrate layer of the array substrate and a refractive index of the gate electrode insulating layer.

4. The display panel of claim 3, wherein, the refractive index of the dielectric layer is an average of the refractive index of the basal substrate layer of the array substrate and the refractive index of the gate electrode insulating layer.

5. The display panel of claim 1, wherein, the first substrate comprises a basal substrate layer of a color film substrate, a black matrix layer, and a common electrode layer; the black matrix layer is disposed on the basal substrate layer of the color film substrate, and the common electrode layer is disposed on the black matrix layer and the exposed basal substrate layer of the color film substrate; the black matrix layer is disposed corresponding to joints of the first color resist, the second color resist, and the third color resist.

6. A display device, wherein, the display device comprises a display panel, the display panel comprising:
   a first substrate;
   a second substrate spaced apart from and opposite to the first substrate, the second substrate comprising sequentially stacked a basal substrate layer of a array substrate, a gate electrode insulating layer, a color resist layer, a protective layer, and a pixel electrode layer, the color resist layer comprising a first color resist, a second color resist, and a third color resist, a thickness of the third color resist being less than a thickness of the first color resist or a thickness of the second color resist; and,
   a liquid crystal layer disposed between the first substrate and the second substrate;
   wherein, a thickness of the protective layer facing the third color resist is smaller than a thickness of the protective layer facing the first color resist and the second color resist, and the thickness of the protective layer is a height difference between a top surface of the protective layer and a bottom surface of the protective layer;
   wherein the first color resist is a red color resist, the second color resist is a green color resist, and the third color resist is a blue color resist;
   the thickness of the first color resist is approximately equal to the thickness of the second color resist;
   a thickness of a deposited film of the third color resist is smaller than a thickness of a deposited film of the first color resist or a thickness of a deposited film of the second color resist;
   the thickness of the first color resist or the thickness of the second color resist is at least 2.40 micrometers, and at most 2.70 micrometers; and
   the thickness of the third color resist is at least 2.30 micrometers, and at most 2.41 micrometers.

7. The display device of claim 6, wherein, the second substrate further comprises a dielectric layer disposed between the basal substrate layer of the array substrate and the gate electrode insulating layer, a refractive index of the dielectric layer being between a refractive index of the basal substrate layer of the array substrate and a refractive index of the gate electrode insulating layer.

8. A liquid crystal display, wherein, the liquid crystal display comprises a display panel, the display panel comprising:
   a first substrate;
   a second substrate spaced apart from and opposite to the first substrate, the second substrate comprising sequentially stacked a basal substrate layer of a array substrate, a gate electrode insulating layer, a color resist layer, a protective layer, and a pixel electrode layer, the color resist layer comprising a first color resist, a second color resist, and a third color resist, a thickness of the third color resist being less than a thickness of the first color resist or a thickness of the second color resist; and,
   a liquid crystal layer disposed between the first substrate and the second substrate;
   wherein, a thickness of the protective layer facing the third color resist is smaller than a thickness of the protective layer facing the first color resist and the second color resist, and the thickness of the protective layer is a height difference between a top surface of the protective layer and a bottom surface of the protective layer;

wherein the first color resist is a red color resist, and the second color resist is a green color resist, and the third color resist is a blue color resist;

the thickness of the first color resist is approximately equal to the thickness of the second color resist;

a thickness of a deposited film of the third color resist is smaller than a thickness of a deposited film of the first color resist or a thickness of a deposited film of the second color resist;

the thickness of the first color resist or the thickness of the second color resist is at least 2.40 micrometers, and at most 2.70 micrometers; and the thickness of the third color resist is at least 2.30 micrometers, and at most 2.41 micrometers.

* * * * *